United States Patent [19]

Slama et al.

[11] 4,237,177
[45] Dec. 2, 1980

[54] CORROSION-RESISTANT COATED ARTICLES

[75] Inventors: William R. Slama, North Olmsted; Robert B. Washburn; Dale J. Semanisin, both of Cleveland, all of Ohio

[73] Assignee: General Signal Corporation, Stamford, Conn.

[21] Appl. No.: 957,084

[22] Filed: Nov. 3, 1978

[51] Int. Cl.³ .......................... B05D 7/00; B05D 1/02
[52] U.S. Cl. .................................. 428/215; 427/299; 427/327; 427/385.5; 427/386; 427/388.1; 427/407.1; 427/409; 427/410; 428/421; 428/422; 428/423.7; 428/425.8; 428/446; 428/458; 428/461; 428/483; 428/500
[58] Field of Search ................... 427/299, 327, 374 R, 427/388 R, 386, 407 R, 409, 410, 407 F, 385.5, 388.1, 407.1, 385.5; 428/421, 215, 422, 446, 458, 483, 500, 461, 423.1, 425.8

[56] References Cited

U.S. PATENT DOCUMENTS

| | | | |
|---|---|---|---|
| 2,777,783 | 1/1957 | Welch | 428/422 |
| 2,809,130 | 10/1957 | Rappaport | 428/422 |
| 3,093,264 | 6/1963 | Harris | 428/421 |
| 3,111,426 | 11/1963 | Capron et al. | 428/421 |
| 3,526,532 | 9/1970 | Heiberger | 428/421 |
| 3,799,832 | 3/1974 | Reick | 428/421 |
| 3,874,903 | 4/1975 | Wirth et al. | 428/421 |
| 4,154,876 | 5/1979 | Segawa et al. | 427/407 F |

FOREIGN PATENT DOCUMENTS

| | | | |
|---|---|---|---|
| 763759 | 3/1971 | Belgium | 427/410 |
| 1228853 | 4/1971 | United Kingdom | 427/409 |

*Primary Examiner*—Ronald H. Smith
*Assistant Examiner*—S. L. Childs
*Attorney, Agent, or Firm*—Cooper, Dunham, Clark, Griffin & Moran

[57] ABSTRACT

Multi-layered coating compositions which comprise one or more inner coating layers which are admixtures of polymers formed from thermosetting polymeric materials and reinforcing filler materials and an outer coating layer which is an admixture of a fluoroelastomeric material and a reinforcing filler material are useful in preventing the corrosion and/or deterioration of surfaces which are in contact with corrosive substances such as strong acids, particularly, sulfuric acid. Such coating compositions are especially useful for preventing corrosion of the surfaces of the chimney liners, flue ducts and scrubbers which are present in many power plants and smelters.

11 Claims, 3 Drawing Figures

CORROSION-RESISTANT COATED ARTICLES

BACKGROUND OF THE INVENTION

1. Field of the Invention

This invention relates to novel coating compositions which are capable of protecting the interior surfaces of chimney liners, flue ducts, and the like from the effects of corrosive substances that are encountered in many of today's industrial locations such as power plants and smelters.

A combination of factors have changed the conditions under which chimneys in such locations as power plants and smelters operate, and have made the problem of corrosion, particularly, acid corrosion, more critical. For example, as the supply of clean burning fuels has decreased, lower quality fuels having higher sulfur contents have been substituted. The combustion of these lower quality fuels results in the production of flue gases which contain corrosive substances, especially sulfur-containing substances. At the same time, utility companies have increased the efficiency of heat utilization so that the temperatures of the flue gases produced have dropped closer to the acid due points. Finally, installations equipped with sulfur dioxide scrubbers produce flue gases which are not only cooler but wetter and consequently discharge a corrosive mist into the lower reaches of the chimney liners. Because of such factors efforts have been undertaken to develop coating compositions which are capable of protecting the surfaces of chimney liners, scrubbers and flue ducts from the corrosive and/or deteriorating effects of substances which come into contact with these surfaces during the operation of power plants, smelters and the like.

2. Description of the Prior Art

In order to combat the problem of surface corrosion of chimney linings, flue ducts, etc., various plastic coatings have been developed for use in protecting their interior surfaces which are typically composed of steel, concrete or brick. One approach has involved the use of a coating layer which includes a polymeric material such as a polyester or a vinyl ester and a reinforcing filler material such as glass flakes.

Another approach has involved the use of a fluoroelastomer as a coating layer. This approach is based in part on such prior art techniques as those of U.S. Pat. No. 3,526,532, which discloses the use of a hydrofluorocarbon coating layer overlaid on a polymeric primer coating as imparting corrosion resistance to a coated metal surface. One such coating is Colebrand CXL2000 developed by Colebrand Ltd., London, England and marketed in the United States by Pullman Power Products, Williamsport, Pennsylvania.

SUMMARY OF THE INVENTION

This invention provides novel coating compositions which are useful in preventing corrosion and/or deterioration of surfaces which are in contact with corrosive substances such as strong acids. The multi-layered coating compositions of the present invention comprise one or more inner coating layers and an outer coating layer. An inner coating layer is placed in physical contact with the surface to be protected and succeeding inner coating layers, if present, are overlaid upon preceding inner coating layers. Each of the inner coating layers is an admixture of a polymer formed from a thermosetting polymeric material and reinforcing filler materials. The chemical properties of the polymers employed are such that adhesion bonding occurs between the first inner coating layer and the surface being coated and that chemical bonding occurs between adjacent inner coating layers if more than one such layer is present. The outer coating layer is an admixture of a fluoroelastomer and a reinforcing filler material which is overlaid upon the outermost inner coating layer. The chemical properties of the fluoroelastomeric material employed are such that a chemical bond forms between the outer coating layer and the inner coating layer with which it is in contact.

In a preferred embodiment of the invention, a primer coating of a polymer formed from a thermosetting polymeric material which is the same as or different from the thermosetting polymeric material present in the first inner coating layer is applied over the surface to be protected prior to the application of the inner coating layers. When such a primer coating is employed the chemical properties of the polymeric material employed are such that adhesion bonding occurs between the primer coating and the surface being coated and that chemical bonding occurs between the primer coating and the first inner coating layer.

It is a principal object of the present invention to provide coating compositions which possess the following desirable physical characteristics: resistance to chemical attack by strong acids; resistance to water or chemical transport; resistance to thermal degradation; and resistance to mechanical and abrasion damage.

It is a related object of this invention to provide a method of preparing coating compositions which possess these desirable physical characteristics.

It is final object of this invention to provide a method of protecting surfaces such as the steel, concrete or brick surfaces found in chimney liners and flue ducts from the effects of corrosive substances such as strong acids.

How these and other objects of the present invention are accomplished will be more readily understood upon reading the detailed description of the invention and the claims which follow.

DETAILED DESCRIPTION OF THE INVENTION

More particularly, the present invention provides multi-layered coating compositions which are useful in preventing corrosion and/or deterioration of surfaces, particularly surfaces which are in contact with corrosive substances such as strong acids, especially, sulfuric acid. These coating compositions are useful for coating the surfaces of flue ducts, chimney liners, scrubbers, tanks, expansion joints and the like where the surfaces come into contact with corrosive substances, particularly, concentrated sulfuric acid. The coating compositions also provide corrosion resistance to hydrochloric acid but are of only limited usefulness in preventing corrosion due to contact with nitric acid.

The surfaces which are being protected may be metals, especially steel, or may be concrete or brick. At present the most important applications of the coating compositions in accordance with this invention involve protection of surfaces which come into contact with sulfuric acid during the operation of power plants burning fossil fuels containing sulfur. When such fossil fuels are combusted, the gases which are produced include sulfur dioxide and sulfur trioxide which condense at the temperatures utilized during combustion of the fuels, typically temperatures up to about 400° to 500° F., producing concentrated sulfuric acid in concentrations as high as 90%.

The multi-layered coating compositions of the present invention comprise one or more inner coating layers and an outer coating layer. Each inner coating layer includes an an admixture of a polymer formed from a thermosetting polymeric material and reinforcing filler material. The chemical properties of the polymers employed are such that bonding occurs between the surface being coated and the inner coating layer with which it is in contact, and such that, if more than one inner coating layer is present, bonding occurs between adjacent inner coating layers. The outer coating layer includes an admixture of a fluoroelastomer and a reinforcing filler material and covers the outermost inner coating layer. The fluoroelastomeric material employed in the outer coating layer is capable, upon heating, of forming a chemical bond with the inner coating layer with which it is in contact.

In a preferred embodiment of the invention a primer coating of a polymer formed from a thermosetting polymeric material, which may be the same as or different from the thermosetting polymeric material in the adjacent inner coating layer, is applied to the surface to be coated prior to the application of the inner coating layer or layers. The chemical properties of the polymer in the primer coating are such that bonding occurs between the primer coating and both the surface being coated and the adjacent inner coating layer.

Figure 1:
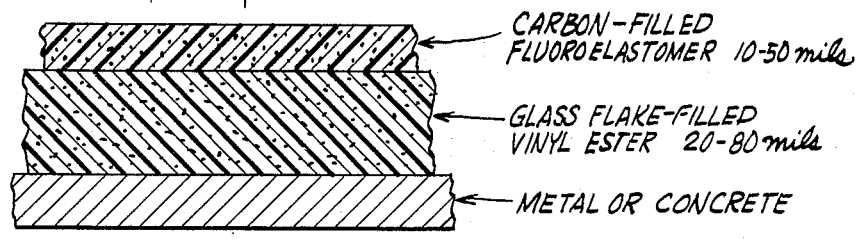
FIG. 1 is a cross-sectional view of a coating composition in accordance with the present invention on a metal or concrete surface. The particular coating composition shown includes a glass flake-filled polymer formed from a vinyl ester as the inner coating layer and a carbon-filled fluoroelastomer as the outer coating layer.

The invention may be better understood by reference to the accompanying drawings. Specifically, FIG. 1 illustrates a coating composition in accordance with the present invention on a surface such as a metal or concrete surface. The coating composition includes an inner coating layer of a glass flake-filled polymer formed from a vinyl ester which has a dry thickness from about 20 to about 80 mils, and an outer coating layer which includes a carbon-filled fluoroelastomer which has a dry thickness from about 10 to about 50 mils.

As set forth hereinabove, the surface being protected may be a metallic or non-metallic surface, for example, a steel, concrete or brick surface. The nature of the surface is limited only by the availability of a compatible polymer coating which will adhere to the surface.

The inner coating layer is an admixture of a polymer formed from a thermosetting polymeric material and a reinforcing filler material. The thermosetting polymeric material may be vinyl ester, polyester, epoxy, furan, phenolic, or urethane, vinyl ester being presently preferred. Preferably, a monomer may be used to crosslink with the polymeric material. Thus when the polymeric material is a unsaturated thermosetting polymer such as vinyl ester it is preferable to include a monomer which is capable of crosslinking with the polymeric material. Examples of such compounds are styrene, acrylates and methylacrylates.

The reinforcing filler material may be any suitable corrosion resistant filler such as glass or mica flakes, carbon, silica, asbestos or glass wool. Glass flakes which are less than 1/64" in length in any dimension are preferred. Such glass flakes are available from Owens Corning Fiberglas Corp., Toledo, Ohio. The inner coating layer is formed as follows. The surface which is to be coated is first cleaned and roughened by any conventional technique, e.g. by sandblasting or acid etching. In this way any weak surface layer is removed permitting stronger adhesive bonding to be obtained between the surface being coated and the inner coating layer. Next a formulation is prepared which includes the thermosetting polymeric material. For example, vinyl ester, in an amount in the range from about 35 to about 55% by weight is mixed with a monomer which includes a vinyl group, for example, styrene, in an amount from about 40 to about 25% by weight and a reinforcing filler, e.g glass flakes, in an amount from about 15 to about 30%. Also desirably included in the formulation are one or more thixotropic agents such as fumed asbestos, fumed silica or clay in an amount less than about 1%, glycerin or a similar polar compound in an amount from about 0.04% to about 0.08%, one or more pigments, particularly metallic oxides such as titanium dioxide or lead oxide in an amount less than about 1%, one or more catalysts, such as a peroxide, e.g. methylethyl ketone peroxide, in an amount from about 1 to about 4%, one or more promotors such as amines or metallic soaps in an amount from about 0.05 to about 0.5%, one or more inhibitors, such as cathechols, quinones and hydroquinones in an amount from about 0.01% to about 0.1% and one or more coupling agents such as silane in an amount less than about 1%.

Within the formulation polymers are formed from the thermosetting polymeric material. In the present example, polymers are formed from vinyl ester and crosslinked with styrene. The final admixture of these materials has a limited "pot" life and must be applied to the cleaned surface within a relatively short time, usually within about 30 minutes to about 2 hours.

The inner coating layer may be applied as a solution or dispersion in any conventional manner including rolling, brushing, troweling, air atomized spraying or airless spraying. Typically, one coat of about 10 to 25 mils dry thickness is applied to the clean surface and then a second coat is applied, also 10 to 25 mils in dry thickness to produce an inner coating layer having a dry thickness of from about 20 to 50 mils. This range provides substantial protection from corrosion to the coated surface. Thus, the inner coating layer provides substantial impermeability to sulfuric acid and water permeability of only about 0.001 perm. inches. Thicknesses less than about 15 mils do not provide adequate protection and thicknesses which are too great may result in a coating layer which tends over time to crack and flake off the coated surface. Thus, it is presently preferred that the thickness not exceed about 80 mils.

Figure 2:
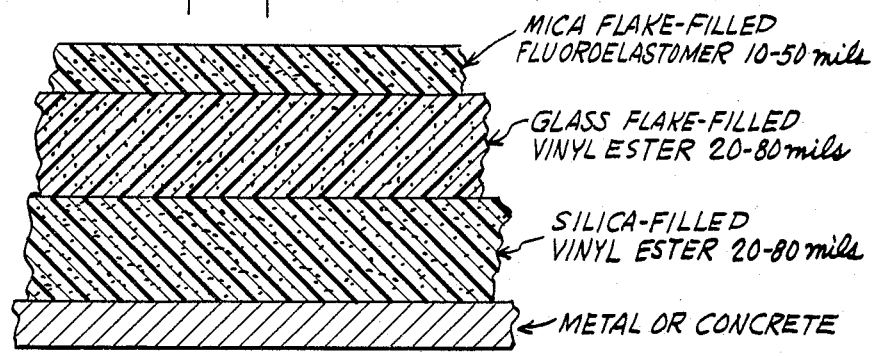
FIG. 2 is another coating composition in accordance with this invention which includes a first inner coating layer of a silica-filled polymer formed from a vinyl ester, a second inner coating layer of a glass flake-filled polymer formed from a vinyl ester and an outer coating layer of a mica flake-filled fluoroelastomer.

As set forth hereinabove, more than one inner coating layer may be employed, each such inner coating layer having a thickness when dry in the range from about 20 to about 80 mils. Each of the inner coating layers may be identical or may vary in the nature of the polymer and/or the reinforcing filler material providing only that the layers be compatible. Thus, for example, FIG. 2 is illustrative of a coating composition which includes two inner coating layers. In both of the inner coating layers the thermosetting polymeric material is vinyl ester but the reinforcing filler material in one layer is silica whereas in the other it is glass flakes.

The outer coating layer is formed as follows. A formulation is prepared which includes a fluoroelastomer typically having a molecular weight less than about $2 \times 10^5$ since presently available fluoroelastomers of higher molecular weight are insoluble and so not useful in the practices of this invention. Examples of such fluoroelastomers are Viton A-35 and B-50, manufactured by E. I. DuPont de Nemours & Co. Inc. Wilmington, Delaware, and Fluorel 2175 manufactured by the 3M Company, Minneapolis, Min. Viton is the trademark for a series of fluoroelastomers based on the copolymer of vinylidene fluoride and hexafluoropropylene. Fluorel is the trademark for a series of fully saturated fluorinated polymers containing more than 60% fluorine by weight. The formulation is prepared by mixing the fluoroelastomer in an amount from about 25 to about 60% by weight and a reinforcing filler such as glass flakes, mica flakes, silica or carbon, carbon being presently preferred. The size of the reinforcing filler particles should preferably not exceed about 1/64" in length in any dimension. The reinforcing filler material is present in an amount from about 10 to about 30% by weight. Also desirably included in the formulation are one or more acid acceptors such as lead oxide capable of reacting with hydrofluoric acid produced during curing of the elastomer in an amount from about 3 to about 15% by weight, one or more curing agents such as amines, diamines, peroxides, bis-phenols or azo compounds in an amount less than about 10% by weight, one or more pigments such as oxides of titanium in an amount less than about 10%, one or more water reactive compounds such as calcium oxide or magnesium oxide to react with water produced during curing of the elastomer. When the fluoroelastomer is Viton A-35 or B-50 as described above, a preferable curing agent is Diak #3 manufactured by DuPont for use with the Viton fluoroelastomers.

The fluoroelastomer, reinforcing filler material and other components are mixed, milled, pulverized and then solvent is added. Useful solvents include organic acetates such as n-butyl acetate and amyl acetate, ketones and esters. When the fluoroelastomer used is Viton A-35, a solvent mixture of n-butyl acetate and amyl acetate in the ratio about 4 parts n-butyl acetate per part amyl acetate is particularly useful. The outer coating layer composition so prepared is applied as a solution or dispersion over the last inner coating layer in such a manner that chemical bonding occurs between the layers. Typically the outer coating layer is applied to a dry thickness of about 10 to about 50 mils using conventional techniques such as those described for application of the inner coating layer.

After a period of time, typically, one day to one week, wherein the solvent is released, the coating composition may be heat cured at a temperature in the range from about 250° to about 500° F. for a period of time of at least 3 hours. Preferably the heat curing is accomplished at a temperature from about 250° to 300° F. for a period of time of at least 8 hours. The outer fluoroelastomer coating layer is permeable to sulfuric acid but protects the inner coating layer from the corrosive effects of strong sulfuric acid. The outer coating layer also provides abrasion resistance.

In a preferred embodiment of this invention, after the surface to be protected is cleaned and roughened and before any oxidation can occur, a primer coating is applied. The primer is a thermosetting polymeric material, particularly, an unsaturated thermosetting polymeric material such as a polyester or vinyl ester. The primer coating is also applied in any conventional manner to a thickness of from about 1 to about 5 mils. When a primer coating layer is used, the first inner coating layer is applied to cover the primer coating layer in such a manner and at such a time that chemical bonding can occur. Subsequent inner coating layers, if present, and the outer coating layer are then applied as described previously.

The following examples are set forth to more clearly illustrate the practices of the present invention without in any way limiting the scope thereof.

EXAMPLE 1.

A steel panel was sandblasted and then a coating of fluoroelastomer was applied over the surface to produce a coating layer having a dry thickness of 30 mils. The chemical resistance of the protective coating laye was then evaluated by the Atlas Test Cell Evaluation (ASTM Test C 868). The coated steel panels were placed in contact with a vapor containing distilled water at 180° F. After two weeks the steel panels were removed from contact with the vapor and examined. The coating layer was blistered and could be readily peeled off the steel panel. The steel panel itself showed visible indications of oxidation.

EXAMPLE 2

Following the same procedure as in Example 1, steel panels were covered with a coating composition such as is shown in FIG. 1. Periodically, over a period of several months, the steel panels were removed from contact with the water containing vapor and examined. No evidence of blistering or damage to the coating layer was found, nor was there any evidence of oxidation of the surface of the steel panel.

EXAMPLE 3

Figure 3:
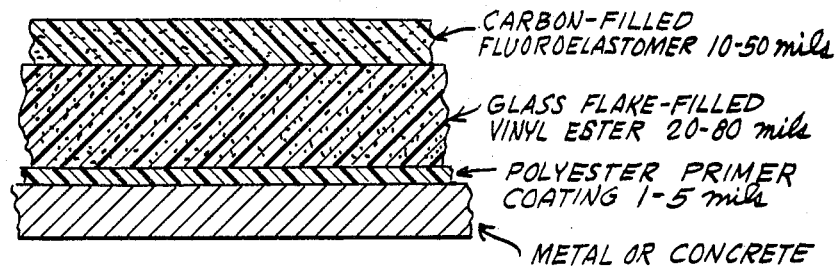
FIG. 3 is still another coating composition in accordance with this invention. This coating composition includes a primer coating of a polyester, an inner coating layer of a flake-filled polymer formed from a vinyl ester and an outer coating layer of a carbon-filled fluoroelastomer.

Following the same procedure as set forth in Example 1, steel panels were covered with a coating composition such as is shown in FIG. 3 and evaluated by the same procedure. During several months the panels were periodically removed from contact with the vapor containing distilled water and examined. No evidence of blistering or peeling of the coating was noted nor was there any indication of corrosion of the steel panel surfaces.

EXAMPLE 4

Steel panels which had been covered with a coating composition as shown in FIG. 1 were installed as part of the chimney lining at a power plant burning fossil fuels. In this field test the panels came into contact with the corrosive substances produced during the normal operation of the power plant. The panels were periodically examined over four months. Some minor blistering of the coating composition was observed although the coating composition continued to adhere to the panels. There was no indication of oxidation of the steel panels.

EXAMPLE 5

Steel panels covered with the coating composition shown in FIG. 3 were also installed at the same power plant as in the preceding example and periodically examined. After four months, no evidence of any blistering or other deterioration of the coating layer was evident. There was no indication of any corrosion of the steel panels.

EXAMPLE 6

Steel panels covered with a coating layer of glass flake-filled vinyl ester were also installed at the same power plant as in the preceding Examples 4 and 5 and periodically examined. After four months major blistering of the coating layer was observed and large patches of coating material could be readily removed from the steel panels. There was significant corrosion of the underlying panels.

EXAMPLE 7

The water vapor transmission of a carbon-filled fluoroelastomer was determined using the water vapor transmission test (ASTM Test E 96). The average permeability of several samples was determined to be 0.001 perm-inches. A combination of the same filled fluoroelastomer and a glass flake-filled vinyl ester was then tested. The average permeability of a series of samples was 0.0007 perm-inches indicating a reduction in water vapor permeability of 30%.

As will be obvious to anyone skilled in the art, many modifications, variations or alterations can be made in the practices of this invention without departing from the spirit or scope thereof.

what is claimed is:

1. A coated article resistant to corrosion and/or deterioration which comprises:
   a substrate;
   a primer coating layer in contact with the surface of said substrate, said primer coating layer being a polymer formed from a thermosetting polymeric material;
   one or more inner coating layers, the first of said inner coating layers being in bonded contact with said primer coating layer and each succeeding inner coating layer being in bonded contact with the preceding inner coating layer, each of said inner coating layers being an admixture of a polymer formed from a thermosetting polymeric material and a reinforcing filler material, and each of said inner coating layers having a thickness from about 20 to about 80 mils; and
   an outer coating layer in chemically bonded contact with the outermost of said inner coating layers, said outer coating layer being an admixture of a fluroelastomer and a reinforcing filler material.

2. A coated article in accordance with claim 1 wherein said thermosetting polymeric material comprises polyester, vinyl ester, epoxy, furan, phenolic or urethane.

3. A coated article in accordance with claim 1 wherein said primer coating layer has a thickness from about 1 to about 5 mils.

4. A coated article in accordance with claim 1 wherein said reinforcing filler material comprises carbon, silica, glass wool, glass flakes or mica flakes.

5. A coated article in accordance with claim 1 wherein said fluorelastomer has a molecular weight less than about $2 \times 10^5$.

6. A coated article in accordance with claim 1 wherein said fluoroelastomer is a substantially fully saturated fluorinated copolymer of vinylidene fluoride and hexafluoropropylene.

7. A coated article in accordance with claim 1 wherein said outer coating layer has a thickness from about 10 to about 50 mils.

8. A coated article in accordance with claim 1 wherein said thermosetting polymeric material in said primer coating layer is polyester, said inner coating layers are each admixtures of polymers formed from vinyl ester with glass flakes, and said outer coating layer is an admixture of a fluoroelastomer and carbon.

9. A coated article resistant to corrosion and/or deterioration which comprises:
   a substrate;
   a primer coating layer in contact with the surface of said substrate, said primer coating layer being a polyester and having a thickness from about 1 to about 5 mils;
   an inner coating layer in bonded contact with said primer coating layer, said inner coating layer being an admixture of a polymer formed from vinyl ester and styrene with glass flakes and having a thickness from about 20 to about 80 mils; and
   an outer coating layer in chemically bonded contact with said inner coating layer, said outer coating layer being an admixture of a fluoroelastomer with carbon and having a thickness from about 10 to about 50 mils.

10. A method of preparing a coated article in accordance with claim 1 which comprises:
    cleaning and roughening the surface of a substrate to be coated;
    covering said cleaned and roughened surface of said substrate with a primer coating layer, said primer coating layer being a polymer formed from a thermosetting polymeric material;
    covering said primer coating layer with one or more inner coating layers, each of said inner coating layers being an admixture of a polymer formed from a thermosetting polymeric material and a reinforcing filler material, and each of said inner coating layers having a thickness from about 20 to about 80 mils;
    applying an outer coating layer over the outermost of said inner coating layers, said outer coating layer being an admixture of a fluoroelastomer and a reinforcing filler material and said outer coating layer being capable of chemical bonding with said outermost inner coating layer; and
    curing the resulting multi-layered coating to produce said coated article.

11. A method of preparing a coated article in accordance with claim 9 which comprises:
    cleaning and roughening the surface of a substrate to be coated;
    covering said cleaned and roughened surface of said substrate with a primer coating layer, said primer coating layer being a polyester and having a thickness from about 1 to about 5 mils;

covering said primer coating layer with an inner coating layer, said inner coating layer being an admixture of a polymer formed from vinyl ester and styrene with glass flakes and having a thickness from about 20 to about 80 mils;

applying an outer coating layer over said inner coating layer said outer coating layer being an admixture of a fluoroelastomer with carbon, said outer coating layer having a thickness from about 10 to about 50 mils, and said outer coating layer being capable of chemical bonding with said inner coating layer;

curing the resulting milti-layered coating to produce said coated article.

* * * * *